United States Patent [19]
Stürzinger

[11] 3,755,631
[45] Aug. 28, 1973

[54] MANUAL ERASE MECHANISM FOR MAGNETIC RECORD

[75] Inventor: Oskar Stürzinger, Baar, Switzerland

[73] Assignee: Anstalt Europaische Handelsgesellschaft, Vaduz, Liechtenstein

[22] Filed: Nov. 9, 1971

[21] Appl. No.: 196,990

[30] Foreign Application Priority Data

Dec. 14, 1970 Switzerland .................. 18525/70

[52] U.S. Cl. 179/100.2 D, 340/174 SR, 340/174.1 R
[51] Int. Cl. .......................................... G11b 5/02
[58] Field of Search .............. 348/174 SR, 174.1 R; 179/100.2 D; 322/10, 40; 178/37, 99

[56] References Cited

UNITED STATES PATENTS

| | | | |
|---|---|---|---|
| 3,327,067 | 6/1967 | Boniface | 179/100.2 Z |
| 3,655,924 | 4/1972 | Puskas | 179/100.2 D |
| 3,351,717 | 11/1967 | Metz | 179/100.2 D |

*Primary Examiner*—Vincent P. Canney
*Attorney*—Sidney G. Faber et al.

[57] ABSTRACT

An information storage with a multiplicity of magnetic storage elements which can be directly electrically controlled through the agency of an input location. The information storage is equipped with an erasing mechanism embodying a mechanical-electrical energy transducer, the electrical outputs of which can be connected with the input location.

5 Claims, 6 Drawing Figures

INVENTOR.
OSKAR STURZINGER

BY

Ostrolenk, Faber, Gerb & Soffen
ATTORNEYS

MANUAL ERASE MECHANISM FOR MAGNETIC RECORD

BACKGROUND OF THE INVENTION

The present invention relates to a new and improved information storage with a multiplicity of magnetic storage elements which can be directly electrically controlled through the agency of a input station or location, and such storage embodying an erasing or clearing mechanism.

To such type information stores or memories there belong, for instance, shift registers wherein the storage elements are for instance constructed as separate polarized relays or as magnetic cores.

Also belonging thereto are those types of information stores where the storage elements are assembled together at a so-called magnetic carrier for instance a magnetic tape or a magnetic plate.

This type of information storage has found wide acceptance because storage of the information or bits is also maintained even upon interruption of the current supply. Hence, here there is afforded extensive safeguards against any unintentional loss of the stored information owing to the occurrence of unusual and undesired situations.

However, situations can arise, especially in the case of stores of average storage capacity, where it is necessary to clear or extinguish for a brief period of time the total information content of the storage or to alter it to such an extent that it can not be subsequently reconstructed. This is especially then the case when the storage is employed for processing secret information, for instance, during research or communication transmission.

In these situations, the information stores are provided with clearing or erasing mechanisms. It is known to the art to employ for the clearing mechanism a so-called noise generator which is operatively coupled with the input location for the purpose of erasing the stored informational content and to deliver thereto, instead of the normal information-containing pulse sequence, i.e., a pulse sequence containing a certain informational content which has meaning, to deliver thereto non-intelligence signals, i.e., purely randomly occurring pulse sequences which then displace the information present at the storage or transform such into a non-usable condition or state.

These known clearing mechanisms however possess the drawback that they also are dependent upon a current supply. This means that in the absence of the current supply, they also are not able to carry out any clearing or erasing of the remaining storage content. Therefore, proposals previously were advanced to equip the prior art erasing mechanisms with independent current sources, batteries for instance. Even these measures could not be considered completely satisfactory in those instances where the erasing mechanism was only used during emergency situations. Furthermore, the proper functioning of a battery power supply is dependent upon its age and oftentimes the situation unfortunately arises that the batteries which are not used during normal operation and only in cases of emergency, just then fail to operate satisfactorily when they are most urgently needed.

SUMMARY OF THE INVENTION

Therefore, from what has been stated above, it will be seen that a real need still exists in the art for a novel information storage with an erasing or clearing mechanism which is not associated with the aforementioned drawbacks and limitations of the prior art constructions. It is a primary object of this invention to provide an information storage equipped with an erasing mechanism which effectively and reliably fulfills the existing need in the art and avoids the previously discussed limitations and drawbacks.

Another and more specific object of the present invention is to provide a novel construction of information storage of the previously mentioned type which affords optimum operational security with regard to its clearing functions under all encountered conditions.

Still a further significant object of this invention aims at constructing the clearing or erasing mechanism in such a manner that its current supply is safeguarded under all circumstances and by means resistant to age effects.

Now in order to implement these and still further objects of the invention, which will become more readily apparent as the description proceeds, the information storage of the previously mentioned type is manifested by the features that the erasing mechanism comprises a mechanical-electrical energy transducer, the electrical outputs of which are connectable with the input location.

BRIEF DESCRIPTION OF THE DRAWINGS

The invention will be better understood and objects other than those set forth above, will become apparent when consideration is given to the following detailed description thereof. Such description makes reference to the annexed drawing wherein:

-figures 1*a* – 1*d*, is a markedly simplified illustration of a shift register during four operational conditions, also illustrating the pulse shapes leading to the assumption of such operational or functional positions;

DETAILED DESCRIPTION OF THE PREFERRED EMBODIMENTS

Figure 1:
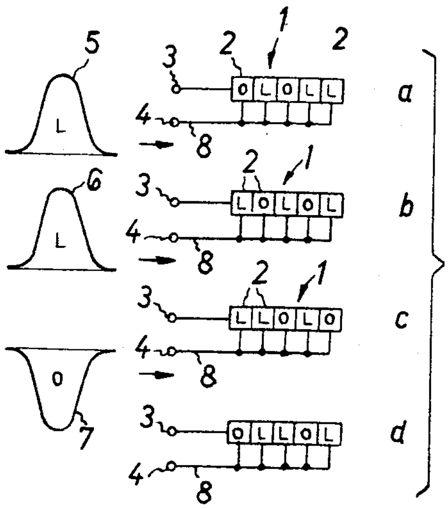
FIG. 1 embodying the sub

Describing now the drawing, in the showing of FIG. 1, embodying the sub-figures 1*a* – 1*d*, reference character 1 designates a shift register having five information storage elements 2. These five storage elements 2 are simply representative of a considerably large number of such storage elements. In each of the storage elements 2 there is stored data which is represented by a binary "O" or "L" condition, which in effect means, for instance, "demagnetized" or "magnetized" respectively.

The storage elements 2 can be directly controlled by the input terminals 3 and 4. The terminal 3 is connected with the first storage element at the left, whereas the terminal 4 is connected through the agency of the conductor 8 to all five storage elements 2, as shown.

Now, if for the informational content or stored data illustrated in FIG. 1*a*, and "L"-pulse 5 is delivered to the shift register 1, then, the first storage element at the left accepts this information whereas the remainder of the stored data content of the shift register 1 will be displaced towards the right by one storage element. In the example under consideration, the stored data content "OLOLL" (FIG. 1*a*) is transformed into the stored data content "LOLOL" (FIG. 1*b*) through the infeed of an "L"-pulse. The content of the fifth storage element at the right disappears.

Now, if with the stored data content of the shift register 1, as shown in FIG. 1*b*, there is further delivered to the shift register 1 an "L" pulse 6, then, there appears the stored data content "LLOLO" illustrated in FIG. 1*c*, whereas if there is further delivered an "O" pulse to such data content, there is then formed the stored data content "OLLOL" as illustrated in FIG. 1*d*. The above should then provide a sufficient understanding of the known mode of operation of such shift register 1.

Now, if the shift register 1 should be cleared of its momentarily stored data or informational content, then a pulse train which does not contain any information should be applied to the input terminals 3 and 4 of the electrical circuitry of FIG. 1, this pulse train should be capable of displacing the previously mentioned stored data content of the storage elements 2, i.e., a pulse train containing as many (positive and/or negative) pulses as there are present storage elements. However, it is also possible to use for such clearing or erasing operation the electrical circuitry depicted in FIG. 2, where the input terminal 3 is connected through the agency of a respective resistor 10 and a conductor 9 with each of the storage elements 2. In this instance, by means of one pulse, for instance the "L" pulse 11, it is possible to simultanteously bring all of the storage elements 2 to the same data or information content as such has been depicted in FIG. 2.

Figure 3:
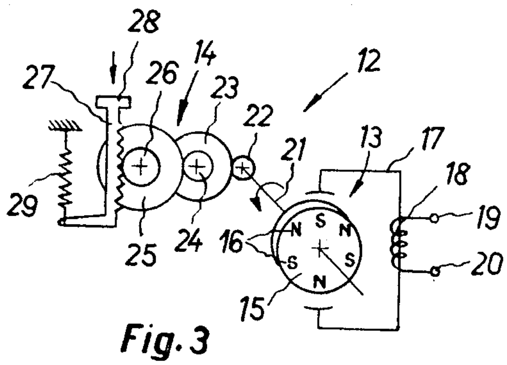
FIG. 3 is a schematic simplified showing of a first embodiment of inventive mechanical-electrical transducer.

Now in FIG. 3, there is illustrated a mechanical-electrical transducer means 12 suitable for clearing the stored data content of the shift register circuit of FIG. 1. This transducer 12 possesses a generator component 13 and a drive component 14. The generator component 13 embodies a permanent magnet rotor 15 having a number of poles 16. This rotor 15 is rotatably mounted upon a shaft 21 within a stator 17, such stator having a winding 18 electrically connected with the terminals 19 and 20, as shown.

A pinion 22 is connected through the agency of a free-wheeling mechanism, which has not been particularly shown, with the shaft 21. This pinion 22 meshes with the larger gear 23 of a first gear train 23, 24, the smaller gear 24 of which meshes with the larger gear 25 of the second gear train 25, 26. Gear 25 is coupled with a smaller gear 26 which, in turn, is in meshing engagement with a rack 27. The rack 27 is displaceable to-and-fro by means of a key or feeler 28 or equivalent device against the action of a suitable spring 29.

From the foregoing, it should be understood that upon forcefully pressing or otherwise actuating the key 28 there appears at the terminals 18 and 19 an alternating-current voltage, the amplitude and frequency of which, among other things, is dependent upon the speed of rotation of the rotor 15.

Now for the purpose of eradicating the stored data or informational content of the shift register 1 of FIG. 1, the input terminals 3 and 4 defining the input location should be connected with the terminals 19 and 20 of the generator component, and the key 28 should be actuated. Now as long as the voltage generated by the electrodynamic generator 13 is greater than the threshold value required for influencing the storage elements 2, then, at the shift register 1 there will be stored either a pulse sequence "OLOLOL . . . " or however, in the event that a suitable electrical valve or other electronic component is connected between the generator 13 and the terminals 3 and 4, for instance, a diode, a pulse sequence "LLLL . . . " or "OOOO . . . ." Therefore, the original stored data content of this shift register 1 will be displaced or cleared.

Figure 4:
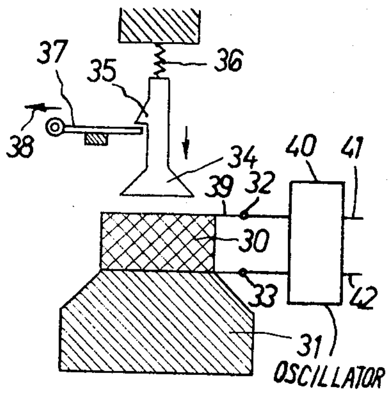
FIG. 4 is a second embodiment of such transducer, also depicting in phantom therein the use of a decaying oscillating circuit.

Another embodiment of mechanical-electrical transducer suitable for the purposes of this invention has been illustrated in FIG. 4. Such will be seen to embody a piezoelectric crystal 30 which is secured to an anvil 31. Output lines 39 lead from the crystal 30 to terminals 32 and 33. An impact hammer 34 is arranged above the crystal 30 which is subjected to the action of a pressure or compression spring 36. The impact hammer 34 is equipped with a pawl or detent 35 whose underside engages a slide element 37. In the illustrated position, the impact hammer 34 is secured in its raised or elevated position. However, as soon as the slide element 37 is retracted in the direction of the arrow 38, then, the hammer 34 will impact against the crystal 30, thereby produces a voltage surge or spike at the terminals 32 and 33.

Figure 2:
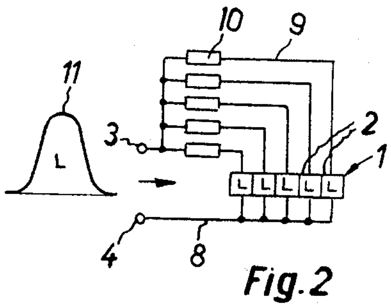
FIG. 2 is a circuit variant of the shift register of FIG. 1.

Now if the terminals 32 and 33 are connected with the terminals 3 and 4 of FIG. 2, then this voltage surge or spike will be sufficient to simultaneously deliver to all of the storage elements 2 the binary or information signal "L," or with reverse polarity, the binary or information signal "O," so that the erasing or clearing operation is realized.

It is here to be mentioned that it would be possible to connect to the transducer of FIG. 4 a conventional oscillating circuit for generating decaying oscillations, which has merely been schematically depicted in phantom lines at 40 in FIG. 4, and which can be energized by the voltage surge produced by the crystal 30. The output terminals 41 and 42 of this oscillator circuit 40 would then be connected with the input terminals 3 and 4 of the circuitry of FIG. 1, whereby the shift register 1 would be subjected to a similar operation as during switching-in of the generator 13.

Figure 5:
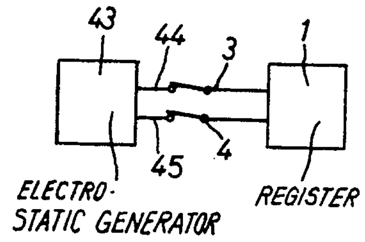
FIG. 5 illustrates the use of an electrostatic generator as the transducer.

By the same token, it should be mentioned that other types of mechanical-electrical transducers could be employed, as for instance an electrostatic generator. Thus, in FIG. 5 there is schematically depicted an electrostatic generator 43 the output terminals 44 and 45 of which are coupled with the input terminals 3 and 4 of the shift register 1.

Figure 6:
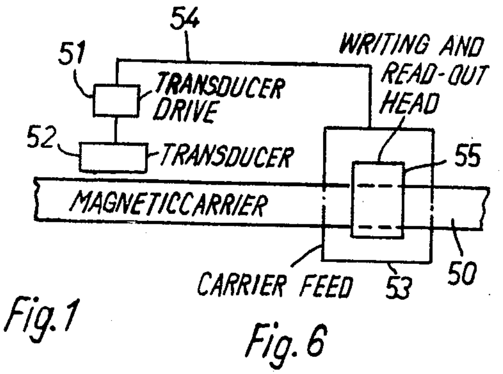
FIG. 6 illustrates a further variant of the invention.

Finally, in the event that the information storage or memory is not in the form of a shift register, rather in the form of a data carrier embodying a magnetic foil carrier 50 as shown in FIG. 6, then, it is advantageous, during performance of the clearing or erasing operation to couple the drive 51 of the mechanical-electrical transducer 52 with the advancing or feed mechanism 53 of the magnetic carrier 50, as schematically indicated at 54 of FIG. 6, which feed mechanism 53 moves the magnetic carrier 50 past a writing and read-out head 55.

While there is shown and described present preferred embodiments of the invention, it is to be distinctly understood that the invention is not limited thereto but may be otherwise variously embodied and practiced within the scope of the following claims.

Accordingly, what is claimed is:

1. Information storage means comprising a register having an input and a plurality of storage stages for inserting data bits into said stages in a serial fashion and displacing bits toward the output end of said register as bits are applied to the input;
  electromechanical means for clearing said register comprising
  movable manual operating means;
  transducer means;
  means coupled between said manual operating means and said transducer means for activating said transducer means to generate at least one output signal upon operation of said manual operating means;
  means for coupling said transducer means to said input for clearing said register of bits loaded into said register previous to the operation of said manual operating means.

2. The device of claim 1 wherein said manual operating means comprises a movable key;
  said transducer means comprising a rotatable magnetic member having a plurality of magnetic poles about its periphery;

a gear train coupled between said movable key and said magnetic member for rotating said magnetic member upon operation of said key.

3. The information storage as defined in claim 1, wherein the storage elements are provided at a magnetic foil carrier, a feed mechanism for advancing said magnetic foil carrier past a writing and read-out head, and means for operatively coupling said mechanical-electrical energy transducer with said feed mechanism of said magnetic foil carrier.

4. The apparatus of claim 1 wherein said transducer means comprises an electromechanical transducer for generating an electrical signal when it undergoes a mechanical impact;
  a hammer member and spring means biasing said hammer member toward said transducer means;
  said hammer means having an abutment;
  said manual operating means having a first position engaging said abutment to maintain said hammer member a spaced distance from said transducer member while said spring means is maintained under tension, and being movable to a second position removed from said abutment to cause said hammer member to strike said transducer means under control of said spring means and thereby generate at least one pulse.

5. The apparatus of claim 4 wherein the output of said transducer means is coupled to oscillator means for generating oscillations to clear said register.

* * * * *